United States Patent [19]

Pollock

[11] Patent Number: 5,171,337
[45] Date of Patent: Dec. 15, 1992

[54] EXHAUST PARTICULATE FILTER

[75] Inventor: James F. Pollock, Old Windsor, United Kingdom

[73] Assignee: United Kingdom Atomic Energy Authority, London, England

[21] Appl. No.: 688,451

[22] Filed: Apr. 22, 1991

[30] Foreign Application Priority Data

Apr. 21, 1990 [GB] United Kingdom ............... 9008983
Apr. 21, 1990 [GB] United Kingdom ............... 9008984

[51] Int. Cl.$^5$ .......................................... B01D 46/00
[52] U.S. Cl. ........................................ 55/284; 55/466; 55/523; 55/487; 55/DIG. 30; 60/311
[58] Field of Search ............... 55/284, 523, 466, 487, 55/DIG. 30; 60/311

[56] References Cited

U.S. PATENT DOCUMENTS

| 4,791,785 | 12/1988 | Hudson et al. ............... 55/523 |
| 4,829,766 | 5/1989 | Henkel ........................... 55/523 |

FOREIGN PATENT DOCUMENTS

| 3529684 | 2/1987 | Fed. Rep. of Germany . |
| 3800723 | 7/1989 | Fed. Rep. of Germany . |
| 203812 | 12/1982 | Japan ........................... 60/311 |
| 93915 | 6/1983 | Japan ........................... 60/311 |
| 1414431 | 11/1975 | United Kingdom . |
| 1482464 | 8/1977 | United Kingdom . |
| 2204220 | 11/1988 | United Kingdom . |

*Primary Examiner*—Bernard Nozick
*Attorney, Agent, or Firm*—William R. Hinds

[57] ABSTRACT

A filter unit (10) for removing particulates from exhaust gases for example from a diesel engine, includes several filter elements (24) arranged so the gas flows through them are in parallel and that no individual element carries more than a fifth of the total flow. Each element (24) comprises a tubular heating element (50) of high voidage electrically conducting material, with a secondary filter layer (52) adjacent to its upstream surface, and with means (53-63) to ensure the gas flow and particulate deposition are substantially uniform over the upstream surface. At intervals the heating elements (50) are electrically energized, in turn, to burn off deposited particulates. At any one time only a subset of the elements (24) is energized through which at that time no more than a fifth of the total gas flow passes. The unit (10) might have thirteen such elements (24), energized one at a time. Alternatively it might have fewer such elements (24) along with a valve to reduce the flow of gas through the element or elements which are at that time being energized.

8 Claims, 2 Drawing Sheets

EXHAUST PARTICULATE FILTER

This invention relates to a filter for removing particulate material from exhaust gases, for example from a diesel engine.

It has been suggested for example in EP 0 112 634 that particulates might be removed from a diesel engine exhaust by means of a ceramic filter. At intervals it is necessary to clean off the particulates so trapped, which are principally of carbon, and this can be achieved by incineration. Incineration may be initiated by injecting a suitable fuel into the exhaust gas, as described in EP 0 132 166, or by throttling the engine air intake so as to raise the exhaust gas temperature, as described in EP 0 010 384. Both these techniques require the use of mechanical components, injectors or valves, which may cause problems due to wear in operation.

It has also been proposed for example in U.S. Pat. No. 4 276 066 to incinerate particles trapped in a ceramic filter by heating part of the filter by means of electric heating wires. Electrical heating of a filter itself is also possible, as proposed in EP 0 244 061, where the filter comprises an electrically conductive fluid-permeable material; a suitable material comprises randomly disposed fibers comprising silicon carbide, which can provide a low density/high voidage filter medium. The document describes filter apparatuses incorporating one or more such filter elements of tubular form, closed at one end, with gas flow radially inwards through each filter element, and means to regenerate the filter elements by supplying electric current to them. The elements are regenerated when they become partially clogged, when the back pressure has become about three times more than that for a clean element, and during regeneration of an element the exhaust gas flow through that element is reduced by for example a valve. However with such tubular filter elements the flow and so the particle deposition tends to vary along the length of the element; and the need for a valve or other mechanism to restrict gas flow is inconvenient.

According to the present invention there is provided a filter for removing particulate material from exhaust gases comprising several filter elements arranged such that gas flows through them are in parallel, each filter element comprising a cylindrical tubular heating element of high voidage, fluid-permeable, electrically conducting material through which the exhaust gas is arranged to flow and in which particulate material thereby becomes trapped, and means for supplying an electric current at intervals to each heating element, to raise its temperature such that combustion of the trapped particulate material occurs, and arranged, when energized, to supply current at any one time only to a subset of the heating elements through which subset no more than a fifth of the total exhaust gas flow passes while the current is supplied to that subset, each filter element also comprising a secondary filter layer of fluid permeable material adjacent to and covering one surface of the heating element, and being provided with means to distribute the exhaust gas flow substantially uniformly over the upstream surface of the filter element.

Preferably no more than a tenth of the total exhaust gas flow passes through the subset while the current is supplied to that subset. In one preferred embodiment there are at least ten filter elements, and current is supplied to only one element at any one time; alternatively there might be twenty filter elements, and current might be supplied to only two elements at any one time. In another embodiment a flow redistribution means may be provided to reduce the flow of exhaust gas through the subset to which current is supplied at a particular time and thus to reduce the electrical power required to initiate and effect incineration of the deposited particulate matter.

In order for ignition to occur the particulates must be heated to about 550°–600° C. in the gas stream, though if a catalyst is provided on the filter, or if a catalyst material such as copper acetate is added to the fuel, the ignition temperature will be lowered to about 420° C. These ignition temperatures are well above the normal operating temperature of the exhaust gas stream, which is typically no more than about 200° C. Consequently if a conventional exhaust filter were to be heated electrically to the necessary ignition temperature the exhaust gas flowing through it would also have to be heated, and this would lead to a considerable power consumption. In the present invention the power consumption is considerably reduced in that no more than a fifth (and preferably only a tenth) of the exhaust gas has to be heated at any one time.

Preferably each heating element is of a fibrous material consisting principally of silicon carbide. Such a heating element may be made by the method described in GB 2 083 330 B; this method involves depositing silicon carbide of very high resistivity onto a fibrous carbon substrate by, for example, plasma-activated vapour deposition, removing the substrate by oxidation, and then heat treating the silicon carbide, normally at above 800° C., to achieve a desired electrical resistivity. The element can have a voidage of between 75 and 90%, and so provides little resistance to gas flow through it, and as long as its temperature does not in use reach that heat treatment temperature, then its electrical conductivity at any lower temperature will not be changed by use.

It is also desirable to provide at the other surface of the heating element a tertiary filter layer. Both the secondary and the tertiary filter layers are preferably of a porous, high voidage, electrically insulating material, which may have different filtration characteristics to those of the heating element itself. They enable desired filtration characteristics to be achieved with a heating element whose pore-size, porosity, and dimensions are determined by electrical considerations. They will become hot when the heating element is electrically heated, and so reduce loss of heat by radiation; in the absence of such a layer a significant proportion of the thermal power would be lost by radiation. The filter layer on the up-stream surface of the heating element helps trap particulates, and when current is supplied to the heating element this filter layer minimizes the extent to which electrical current flows through the deposited particulates. The filter layer on the down-stream surface may be such as to trap small particulates which have passed through the up-stream layer and the heating element, so improving the efficiency of the filter element.

It is preferable that these layers produce little resistance to the gas flow, and so they are desirably of high voidage material between about 50 and 80% voidage. The layers might he of alumina, or might be a fibrous structure produced by a modification of the method described in GB 2 083 330 B: they might be of silicon carbide produced by vapour deposition but which has not been given a heat treatment and so is of very high resistivity, or might be of silica produced by vapour deposition of silane with oxygen present. Furthermore the filter layer on the up-stream surface of the heating element may be thinner than that on the down-stream surface, as heat must be transferred through it to ignite particulates on the up-stream surface of that layer.

The flow distribution means provides benefits, as it ensures the trapping of particulates occurs substantially uniformly over the up-stream surface of each filter element. With a tubular filter element closed at one end and with the exhaust gas supplied to the bore of the element along its longitudinal axis, without a flow distribution means most of the exhaust gas flow and hence the particulate deposition would occur initially near the closed end. This could result in the filter element becoming blocked at its closed end, and the blockage progressively spreading along the element. Once the element became substantially blocked in any region the gas flow in that region would be reduced, so that when current was supplied to the heating element the time taken for complete incineration would be increased for that region, owing to both the reduced gas flow and the fact that combustion can only occur at the surfaces of the deposit to which the gas has access. This problem of non-uniformity of deposition can also occur where the gas flow is radially inwards through the tubular walls; in this case most of the gas flow and hence particulate deposition would occur near the open end. The problem arises for elements whose length to internal diameter ratio exceeds about one, and becomes worse as that ratio increases. It is overcome in the present invention by the flow distribution means; this consists for example of a plurality of nested coaxial tubes arranged to convey exhaust gas to or from the filter element, each tube having a flange at one end adjacent to the filter element. The tubes thus define a plurality of concentric ducts for the gas flow, and the flanges ensure that there are a plurality of gas stagnation points spaced along the filter element. Each concentric duct thus distributes gas to a respective section of the filter element, the dimensions of the tubes being such that the flow is substantially uniform throughout the length of the filter element. The number and geometry of the tubes however must not be such as to create a significant resistance to flow of the exhaust gas into or out of the filter element.

It is desirable for the elements to be regenerated at frequent intervals, before the pressure drop across an element has appreciably built up due to clogging by particulates. This ensures that the gas flow through an element undergoing regeneration does not significantly increase during the regeneration process; such a gas flow increase would increase the rate at which the gas transfers heat away from the element and so increase the electrical power required to maintain combustion of the particulates.

The invention will now be further described, by way of example only, and with reference to the accompanying drawings in which.

Figure 1:
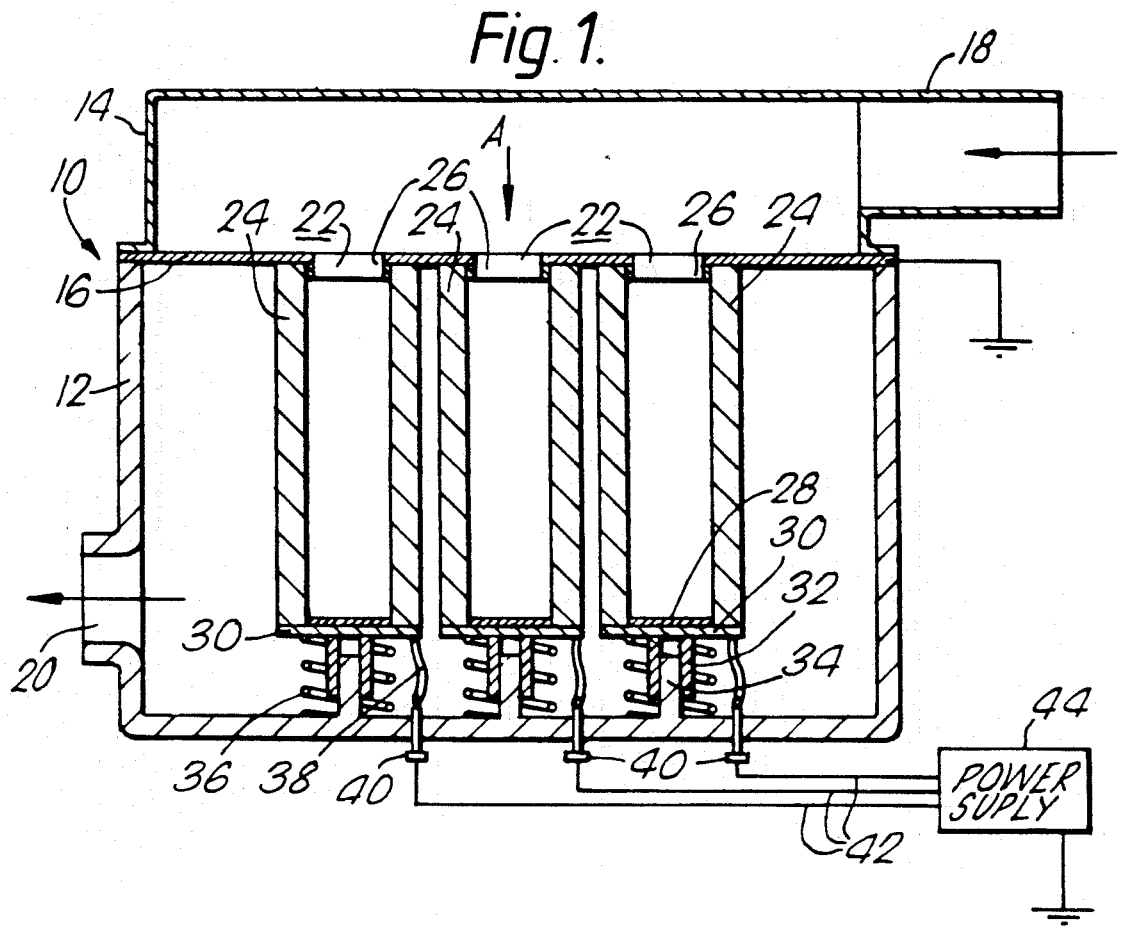
FIG. 1 shows a sectional view through an exhaust particulate filter (on the line I—I of FIG. 2)
Figure 2:
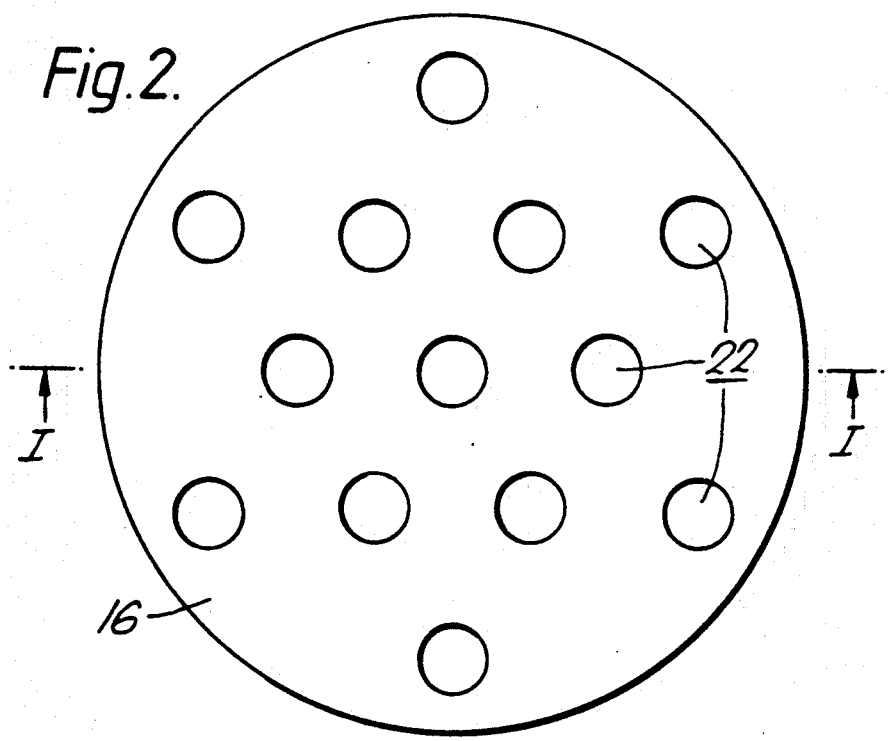
FIG. 2 shows a view in the direction of arrow A of FIG. 1.

Referring to FIG. 1, a filter unit 10 is shown, for removing particulates from an exhaust gas stream from a diesel engine. The unit 10 comprises a cylindrical lower casing 12 of a ceramic material, and a cylindrical upper casing 14 of stainless steel, together defining a cylindrical chamber, the chamber being divided into two by a perforated stainless steel plate 16. The lower casing 12, the plate 16, and the upper casing 14 are clamped together, the joints providing a gas-tight seal. The upper casing 14 defines a radially extending inlet duct 18 which is connected to the engine exhaust manifold (not shown), while the lower casing 12 defines a radially extending outlet duct 20 for filtered exhaust gases. As shown in FIG. 2, the plate 16 defines thirteen hexagonally arranged circular apertures 22. Thirteen identical filter elements 24 are located in the lower casing 12, clamped between the base of the lower casing 12 and the perforated plate 16, one filter element 24 corresponding to each aperture 22 (for clarity, only those in the plane of the Figure are shown in FIG. 1).

Each filter element 24 is of tubular cylindrical form and comprises a tubular heating element of high porosity, fibrous, electrically conducting, silicon carbide material. (Other features of the elements 24 are described below in relation to FIG. 3). At its upper end (as shown) each element 24 is located by a short tubular flange 26 projecting from the plate 16 around each aperture 22, and its upper annular flat face abuts and makes good electrical contact with the plate 16 through a gasket (not shown) comprising an annular deformable pad of 10 micrometer diameter stainless steel fibers. The plate 16 is electrically earthed. At its lower end, each element 24 is located by a central ceramic boss 28 on the upper surface of a circular copper electrode 30; the boss 28 fits into the element 24 and the electrode 30 makes good electrical contact with the lower annular flat face of the element 24 through another fibrous stainless steel annular pad or gasket (not shown). Each electrode 30 is supported by means of a sleeve 32 fixed to its lower surface, and slidable on a respective rod 34 projecting upwards from the base of the lower casing 12, so it is constrained against any sideways movement but can move freely axially. A respective compression spring 36 urges each electrode 30 into contact with its respective filter element 24. Electrical connections to each electrode 30 are made by respective flexible copper straps 38 joined to copper terminals 40 which project through the base of the lower casing 12. Each terminal 40 is connected by a respective cable 42 (only three are shown) to a 50 volt power supply 44, which when energised supplies a current of about 40 amps.

In operation of the diesel engine, particulates which principally comprise carbon are found in the exhaust gases; the total gas flow is typically of the order of 4 m³/min at STP. The gases flow into the filter unit 10 through inlet duct 18, through the apertures 22 in the plate 16, radially outwards through the tubular walls of the thirteen filter elements 24, and so out of the outlet duct 20. The flows through the filter elements 24 are thus in parallel, so the flow through each element 24 is about a thirteenth of the total gas flow (although it is unlikely that the flow will be exactly equal through each one). The particulates are trapped at the inner surfaces of the elements 24 and within the elements 24. Every thirty seconds the power supply 44 is energised to supply electrical current to one of the elements 24, the power dissipation being such that after twenty seconds the particulates on that element 24 reach ignition temperature and burn off, and the power supply 44 is de-energized. The power supply 44 is arranged to supply current to all the elements 24 in turn, one at a time; consequently current is supplied to any one element 24 at intervals of 390 seconds.

The times and durations mentioned above are by way of example only. The current must be supplied to each element 24 for sufficient time that substantially all the carbon trapped by that element has been oxidised, and this time depends on the element geometry, the gas flow through it, and the time period between successive occasions on which current is supplied to that element 24. This time period should be sufficiently short that there is very little build up of trapped particulates in and on the element 24. Consequently there will be very little change in the pressure difference across the element 24, and because the deposited carbon layer will be thin it will burn off rapidly once ignition temperature has been reached. There may also be a time interval between switching off the current to one element 24 and supplying current to the next element 24.

Figure 3:
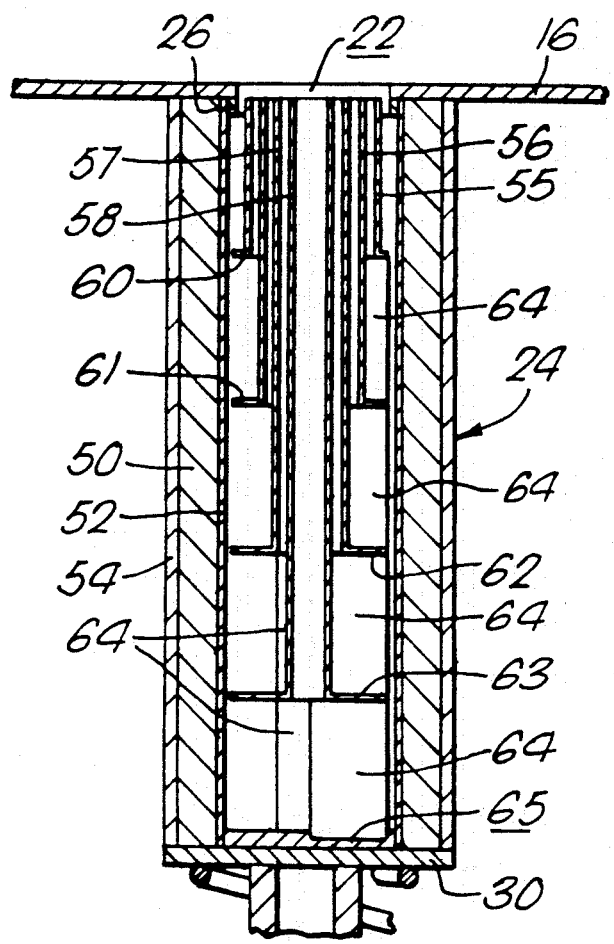
FIG. 3 shows to a larger scale, and in greater detail an element of the filter of FIG. 1.

Referring to FIG. 3, one of the filter elements 24 is shown in greater detail. The element 24 comprises a tubular heating element 50 of fibrous silicon carbide conducting material, of length 100 mm and external diameter 50 mm, with close-fitting electrically insulating sleeves 52 and 54 covering its inner and outer surfaces. The sleeves 52 and 54 are of fibrous silicon carbide insulating material, and have a voidage of about 80%, similar to that of the heating element 50. When current is passed through the heating element 50 it reaches a temperature which may be as high as 800° C., and the sleeves 52 and 54 absorb heat by radiation from the heating element 50. Particulate carbon deposited in both the sleeves 52 and 54 and the heating element 50 is therefore oxidised, while heat losses by radiation from the filter element 24 are reduced because the sleeves 52 and 54 ensure that the surfaces of the filter element 24 are not as hot as the heating element 50.

Within the bore of the filter element 24 are four nested coaxial tubes 55, 56, 57 and 58, open at each end but of progressively greater length as their diameter gets less. At the lower end of each tube 55-58 is a radially extending flange 60, 61, 62 and 63, all of which have an external diameter just less than the internal diameter of the inner sleeve 52. The flanges 60-63 are equally spaced apart along the bore of the filter element 24 by vertical spacing webs 64 which lie in equally spaced radial planes. Between each flange 60-62 and the next flange 61-63, and between the bottom flange 63 and the boss 28, there are three such webs 64 (not all of which are visible in the Figure). The bottommost set of three webs 64 locates in corresponding slots 65 (only one of which is shown) in the boss 28. At the aperture 22, the outermost tube 55 is supported and spaced apart from the flange 26 by three ceramic spacers (not shown). The dimensions of the tubes 55-58 are such that the radial flow of exhaust gas is approximately equal through all five of the portions of the filter element 24 defined by the planes of the flanges 60-63. Consequently the deposition of particulates is substantially uniform over the whole inside surface of the inner sleeve 52; in the absence of the tubes 55-58 and the flanges 60-63 there would tend to be greater gas flow and so greater deposition near the closed, lower end of the filter element 24.

It will be appreciated that a filter unit may differ in various ways from that described above, while remaining within the scope of the invention. For example instead of having radial flanges at the lower end of each tube 55-58, the lower end portion of each tube might rapidly increase in diameter like a trumpet bell, flaring outwards into the radial plane. This could be expected to reduce any tendency for deposition of particulates to occur on the flange itself. Similarly the boss 28 might have a flared, generally conical shape similar to that of the flanges, to minimize stagnation of the gas flow at the closed end of the filter element 24. Equally the number of tubes and flanges might differ from that described, as too may their modes of support.

It will also be appreciated that the filter element 24 itself might also differ, for example in not having an external sleeve 54. Instead there might be provided a thin ceramic, non-porous, cylindrical tubular radiation shield, spaced apart from the outside surface of the heating element 50 but concentric with it and extending the length of the heating element 50. The filtered gas would have to flow axially between this shield and the element 50, though instead of a single radiation shield there might be a plurality of such shields along the length of the element 50 with axial gaps between them for radial gas flow. The methods of support for the filter element 24 and for making electrical contact to it might also differ from that described, for example the perforated plate 16 might be of copper, or alternatively separate end contacts and leads might be provided to make electrical contact to the upper ends of each of the filter elements 24. The stainless steel fibrous gaskets or pads at each end of the filter element 24 might be replaced by foil gaskets of a soft ductile metal such as a silver alloy which does not readily oxidise. These gaskets may provide adequate support for the element 24, so that the tubular flange 26 and the boss 28 can be dispensed with; indeed the plate 16 and the lower electrode 30 might instead be provided with spikes which would embed in the ends of the heater element 50 to hold it against sideways movement, so that no gaskets would be needed either. The filter elements 24 might be arranged so the gas flow through them was radially inwards. And the number and arrangement of filter elements in a filter unit might differ from that described, as long as no individual element carries more than a fifth of the total gas flow, preferably no more than a tenth.

It will be appreciated that the mode of operation might differ from that described above. For example rather than supplying current to any one element 24 at regular time intervals of 390 seconds, instead the time for which current is supplied to any one element 24 on any one occasion might be adjusted in accordance with the engine speed, or the rate of change of pressure difference across the elements 24, which are both related to the rate of deposition of trapped particulates, and the time intervals between switching off the current to one element 24 and supplying current to the next element 24 might also be varied. Yet again, energizing of the power supply 44 might instead be in response to a sensed increase in pressure difference between the gases in the lower casing 12 and the upper casing 14; when a critical pressure difference is sensed current is supplied to each element 24 in turn as described above, but only once to each.

An alternative filter unit (not shown) has six filter elements 24 identical to those described above arranged in a circular array in a two-part casing with a perforated divider plate (not shown) similar to that described above. A vane or baffle (not shown) is pivotally supported by the divider plate at the center of the circle, and means are provided to rotate the vane about its support so that the six apertures through which exhaust gas enters the six filter elements 24 are obstructed in turn by the vane. The vane obstructs the gas flow to no more than one element 24 at any one time and ensures that only a tenth of the total gas flow passes through the obstructed element 24, and the power supply is arranged to operate in synchronism with the rotation of the vane to supply current only to the obstructed element.

This filter unit operates in a similar manner to that described above, the particulates being incinerated on each element in turn.

It will be appreciated that a filter unit with such a vane or baffle might have less than five filter elements 24, because the vane ensures that at any one time no more than a fifth and preferably no more than a tenth of the total gas flow has to pass through an element to which current is being supplied.

The filter element 24 described above would also be suitable for heating a gas stream to a steady high temperature (say above 350° C.). At such temperatures there can be significant inefficiencies due to losses of heat by radiation, but those losses can be minimized by the inner and outer porous sleeves; it is also advisable to arrange for the gas flow to be radially inward so that the external surfaces are the coolest. Uniformity of gas flow is also an important consideration, and this can be enhanced by flow distribution means (similar to the tubes 55-58 and flanges 60-63) both inside and outside the heating element. The essential features of such a gas heater are the permeable electrically conducting heating element, and high porosity, gas permeable layers adjacent to and covering both the inflow and outflow surfaces of the heating element, the element and the layers being of such a thickness and such a porosity that the total pressure drop due to gas flow through the heater is no more than about 500 Pa, and such that in operation there is a significant temperature difference between opposite surfaces of each said layer.

Figure 4:
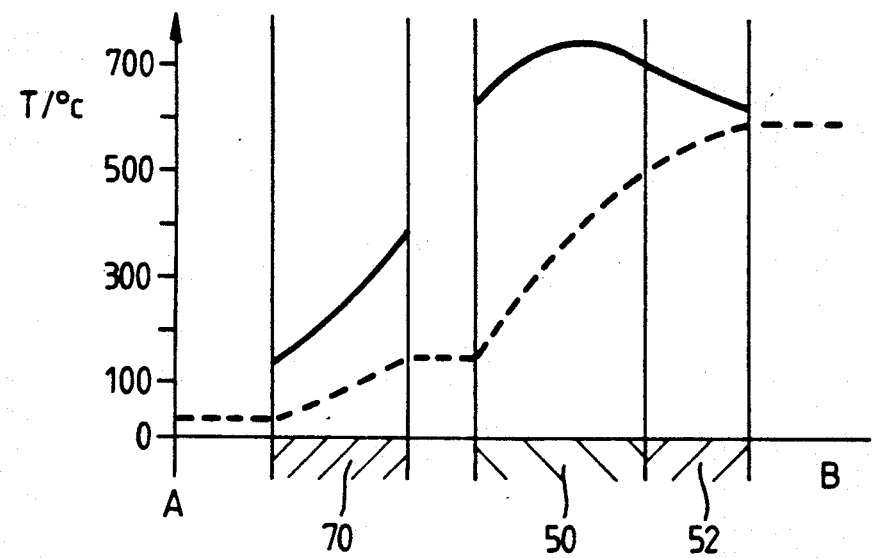
FIG. 4 shows graphically the temperature distribution through an air heater.

Referring to FIG. 4 there is shown graphically the temperatures during operation along a radial line through a gas heater arranged to heat a flow of air. The heater is of tubular cylindrical form, comprising a heater element 50 (as described above) of wall thickness 5 mm, with a close-fitting porous sleeve 52 (as described above) of thickness 3 mm covering its inner surface. Spaced radially from the outer surface of the element 50 by a 2 mm wide gap is a 4 mm thick cylindrical sleeve 70 of 80% porosity, fibrous stainless steel. The gas is arranged to flow radially inwards, A indicating the outside of the heater, and B the bore, the solid line indicating the temperatures of the sleeves 52 and 70 and the heater element 50, and the broken line that of the gas. The gas flow rate is 5 liter/sec (at STP).

The heater element 50 becomes hot due to the electric current, reaching a temperature of about 700° C. and transferring heat by conduction to the flowing gas, and by radiation to the outer sleeve 70 and the inner sleeve 52, which both heat up, though to different degrees. Heat transfer between fibers in the sleeve 52 and in the sleeve 70 is principally by radiation, while heat is also transferred by conduction through and along fibers. The rate of heat transfer by conduction and convection to the flowing gas as it passes through a fibrous high voidage material (whether the element 50 or one of the sleeves 52 and 70) depends on the temperature difference between the gas and the fibers, on the surface area of the fibers, and on the gas velocity, increasing as the velocity increases.

The gas, air, enters at about 25° C. and leaves at 600° C., and is always at a lower temperature than the material through which it is flowing. Heat is transferred to the outer sleeve 70 by radiation from the element 50, and most of this heat is transferred to the flowing gas, so the external surface of the sleeve 70 is at a comparatively low temperature which may be less than 150° C., and so heat losses to the surroundings (by radiation) are low. The inner sleeve 52 also receives heat by radiation from the fibers of the element 50, and transfers heat to the flowing gas. The inner surface of the inner sleeve 52 is only slightly above the exit gas temperature, at about 615° C.; although there is some heat loss from this inner surface by radiation to its surroundings, this heat loss is minimized by the fact that lower temperature surroundings are only present at the ends of the bore B.

I claim:

1. A filter for removing particulate material from exhaust gases comprising several filter elements arranged such that gas flows through them are in parallel, means for guiding exhaust gases to flow through said filter elements in parallel, each filter element comprising a cylindrical tubular heating element of high voltage, fluid-permeable, electrically conducting material through which the exhaust gas is arranged to flow and in which particulate material thereby becomes trapped, and means for supplying an electric current at intervals to each heating element, to raise its temperature such that combustion of the trapped particulate material occurs, and arranged, when energized, to supply current at any one time only to a subset of the heating elements through which subset no more than fifth of the total exhaust gas flow passes while the current is supplied to that subset, each filter element also comprising a secondary filter layer of fluid permeable material adjacent to and covering one surface of the heating element, and being provided with means to distribute the exhaust gas flow substantially uniformly over the upstream surface of the filter element.

2. A filter as claimed in claim 1 wherein each heating element is of a fibrous material consisting principally of silicon carbide having a voidage between 70 and 90%.

3. A filter as claimed in claim 1 wherein the flow distribution means comprises a plurality of nested flanged tubes.

4. A filter as claimed in claim 1 wherein no more than a tenth of the total exhaust gas flow passes through the said subset while the current is supplied to it.

5. A filter as claimed in claim 4 comprising at least ten filter elements, the current supply means being arranged to supply current at any one time to only one element.

6. A filter as claimed in claim 1 in which each filter element also comprises a tertiary filter layer of fluid permeable material adjacent to and covering the other surface of the heating element.

7. A filter as claimed in claim 6 wherein the upstream filter layer is thinner than the downstream filter layer.

8. A filter as claimed in claim 6 wherein the secondary and tertiary filter layers are of porous high-voltage materials, and have different filtration characteristics to those of the heating element.

* * * * *